R. H. KERKOW.
CHAIN CONNECTOR.
APPLICATION FILED JULY 5, 1921.

1,435,479.

Patented Nov. 14, 1922.

Inventor
R. H. Kerkow.

By
Attorney

Patented Nov. 14, 1922.

1,435,479

UNITED STATES PATENT OFFICE.

ROBERT H. KERKOW, OF WEST POINT, NEBRASKA.

CHAIN CONNECTOR.

Application filed July 5, 1921. Serial No. 482,465.

*To all whom it may concern:*

Be it known that I, ROBERT H. KERKOW, a citizen of the United States, residing at West Point, in the county of Cuming and State of Nebraska, have invented certain new and useful Improvements in a Chain Connector; and I do hereby declare the following to be a full, clear, and exact description of the invention, such as will enable others skilled in the art to which it appertains to make and use the same.

The invention relates to fasteners for connecting two members such as the ends of a tire or mud chain for automobiles and motor vehicles of every description.

The invention provides a connection of the lever type and aims to simplify fasteners of this nature and prevent casual loosening and opening when in service with the consequent loss of the chain.

The invention furthermore provides a connector which enables a leverage action being brought into play for tightening the same and which when under tension cannot open and when in service will not release the chain by the action of mud, gravel or other obstruction coming in contact therewith.

Other subjects and advantages will be apparent and suggest themselves as the nature of the invention is understood.

While the drawing illustrates an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 4 is a view similar to Figure 1, the near plates being omitted.

Corresponding and like parts are referred to in the following description and designated in the several views of the drawing by like reference characters.

Figure 1:
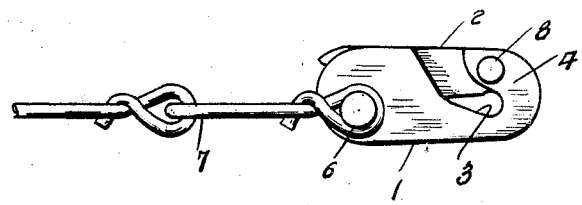
Figure 1 is an elevation of a connector embodying the invention, showing the same in closed position.
Figure 2:
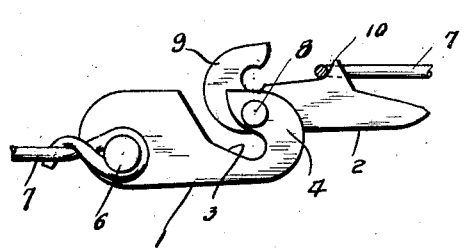
Figure 2 is a view similar to Figure 1, the lever member being fully open and the free end of the chain applied thereto.
Figure 3:
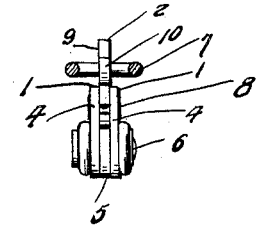
Figure 3 is an end view, the parts being in the position shown in Figure 2.
Figure 3:
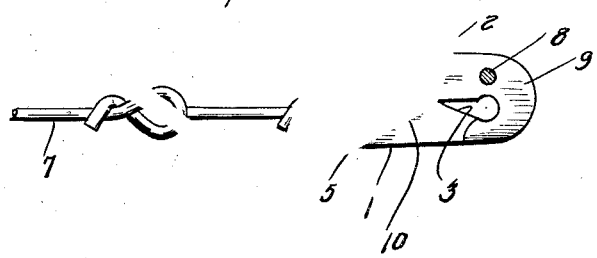

The connector comprises similar or like side plates 1 which are spaced apart to receive a lever member 2 between them. Opposed slots 3 are formed in corresponding edges of the plates 1 and are upwardly and outwardly curved to provide a hook 4 at one end of the connector. A spacing element 5 such as a washer is interposed between the opposite ends of the plate 1. One end of the chain 7 is connected to the fastener by means of the pin 6 and the opposite or free end of the chain 7 is engaged by the hook 4. The lever member 2 is pivoted at one end between the hook ends of the plate 1 by means of a fastener 8 which preferably consists of a rivet. The pivotal end of the lever member 2 is provided with a hook 9 which cooperates with the hook 4 of the side plates 1. The lever member 2 is provided near its free end with a projection 10 which extends in the same general direction as the hook 9. The edge portion of the lever member 2 between the hook 9 and projection 10 is spaced to admit of the links at the free end of the chain 7 riding thereon. The lever member 2 is of such relative length that its free or swinging end projects slightly beyond the heel or button of the connector to form a finger piece as indicated most clearly in Figures 1 and 4. When the lever member 2 is in closed position as shown in Figures 1 and 4 it extends over the mouth or receiving end of the slot 3 and closes the same and prevents casual disengagement of the free end of the chain 7 from the connector. When the member 2 is closed the plates of the hooks 4 and 9 are forwardly of the pivot fastening 8 and between the bills and the shanks of the hook members with the result that when the connector is under tension there is no liability of the member 2 accidentally opening. The side plates 1 are drawn together by the fastenings 6 and 8 in such a manner as to frictionally engage the sides of the lever member 2 and prevent accidental opening thereof under ordinary conditions whereby preventing loss of the chain or loosening thereof. Preliminary to connecting the chain the link at the free end is placed upon the lever member 2 in engagement with the projection 10 thereof and when swinging the lever member into closed position it operates to draw the ends of the chain together by a leverage action thereby insuring proper tightening of the same. The projection 10 acts as a stop to prevent displacement of the free end of the chain during the initial closing of the member 2.

When the member 2 is closed it is retained in such position by the tension of the chain on the bight of the hook 9.

Having thus described the invention, what I claim is:—

A chain connector comprising spaced side plates having opposed slots curved upwardly and outwardly to provide hooks at one end of said plates, means connecting the plates adjacent the ends, and one of said means having one end of a chain connected thereto, washers on said means and arranged between said plates to properly space the latter, a lever having one end curved to provide a hook and pivoted on the other means and operable between the first named hooks and adapted to engage the other end of the chain, a projection formed on one end of the lever and spaced from the hook and free end of said lever to be engaged by the chain when the lever is in an open position and when being moved towards a closed position, said means adapted to cause the plates to frictionally grip the lever when the latter is positioned between the former.

In testimony whereof I affix my signature in presence of two witnesses.

ROBERT H. KERKOW.

Witnesses:
FRANK J. MALCHOW,
CHARLES GIVENS.